Nov. 1, 1949  F. A. FANTA, JR  2,486,935
VOLTAGE CONTROLLED PROPORTIONAL
POSITIONING APPARATUS
Filed July 24, 1946  2 Sheets-Sheet 1
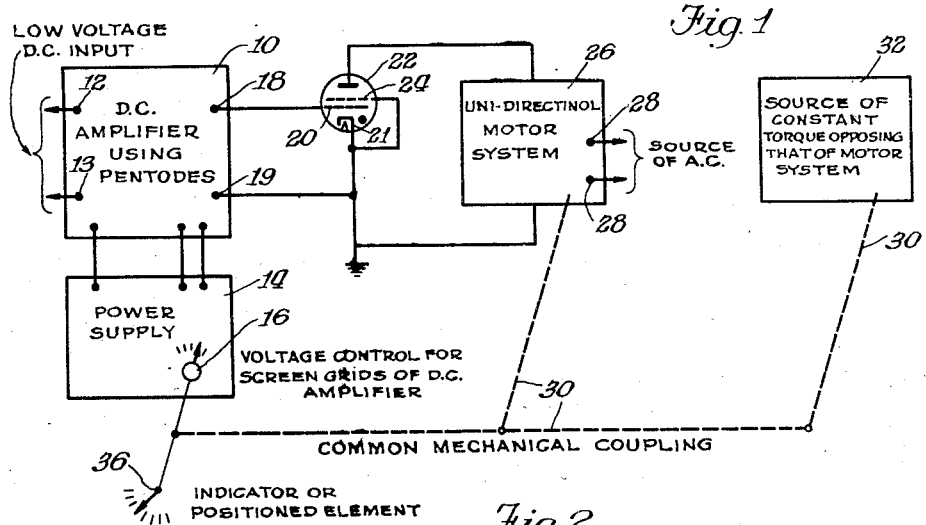
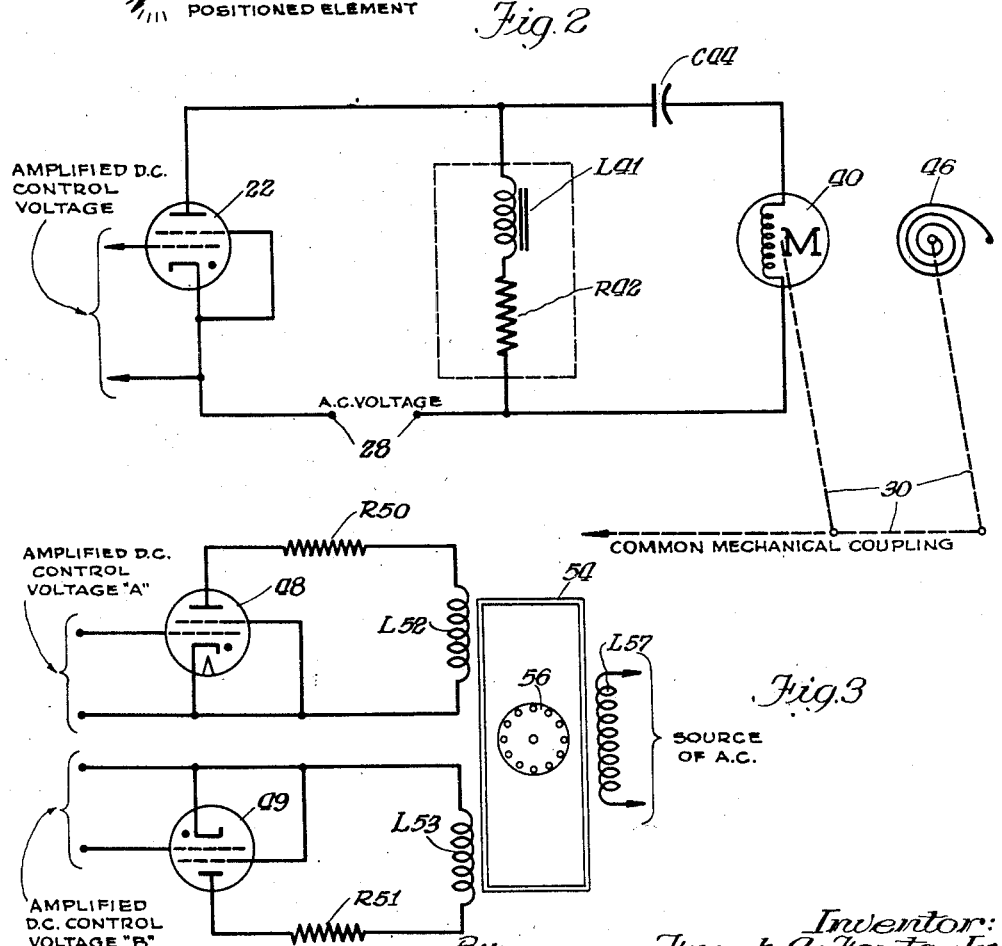
Inventor:
Frank A. Fanta Jr.
By: Hinkle, Horton, Aehlberg, Hausmann, Wupper
Attorneys.

Nov. 1, 1949         F. A. FANTA, JR         2,486,935
            VOLTAGE CONTROLLED PROPORTIONAL
                   POSITIONING APPARATUS
Filed July 24, 1946                      2 Sheets-Sheet 2
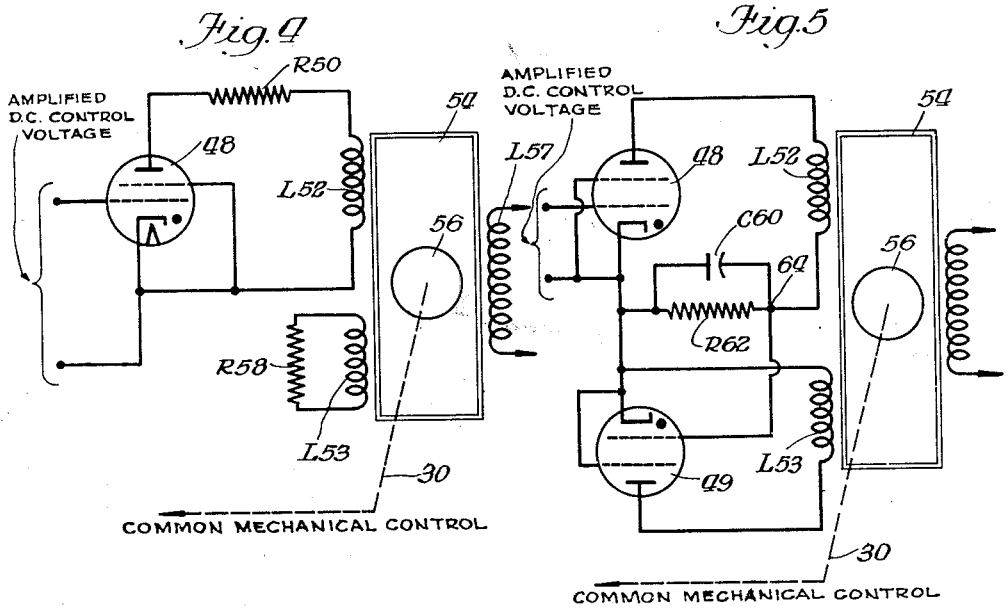
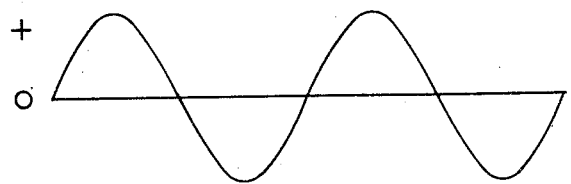
Fig. 6
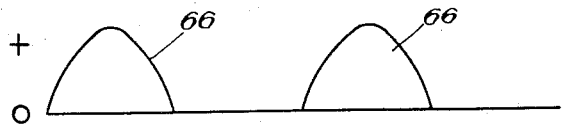
Fig. 7
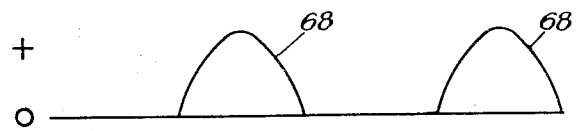
Fig. 8
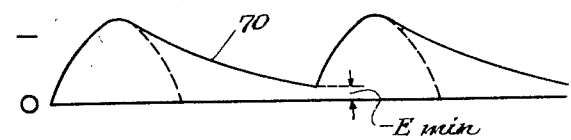
Fig. 9
Inventor:
Frank A. Fanta Jr.
By:
Hinkle, Horton, Ahlburg, Hausmann & Kapper
Attorneys.

Patented Nov. 1, 1949

2,486,935

UNITED STATES PATENT OFFICE 2,486,935

VOLTAGE CONTROLLED PROPORTIONAL POSITIONING APPARATUS

Frank A. Fanta, Jr., Berwyn, Ill., assignor to Stewart-Warner Corporation, Chicago, Ill., a corporation of Virginia Application July 24, 1946, Serial No. 685,891

3 Claims. (Cl. 318—28)

My invention relates generally to electrical control apparatus, and more particularly to improved means for proportionately positioning one element in response to a control voltage.

The invention may be utilized in a large variety of different types of control apparatus, as for example, in apparatus in which a part is to be moved proportionately with the degree of illumination, with respect to temperature, air velocity, or in connection with any other variable condition which may be translated into an electrical potential change.

It is thus the primary object of my invention to provide an improved control system for accurately positioning an element in response to the degree of another condition capable of being translated into an electrical potential.

A further object is to provide an improved control apparatus incorporating a thyratron controlled alternating current motor.

A further object is to provide an improved control mechanism for a shaded pole type motor, whereby the latter may be caused to rotate in either direction to the extent necessary to position a part in response to a change in a controlling voltage.

A further object is to provide an improved positioning control mechanism wherein a part is differentially positioned in response to the relative values of two different control factors translated into direct current voltages.

Other objects will appear from the following description, reference being had to the accompanying drawings, in which:

Fig. 1 is a diagrammatic illustration of the improved control system;

Fig. 2 is a schematic wiring diagram of the improved thyratron controlled unidirectional motor system forming a part of the control apparatus of Fig. 1;

Fig. 3 is a schematic diagram of a modified form of the invention, in which the apparatus is subjected to the control of two different potential sources;

Fig. 4 is a schematic wiring diagram of a motor control system for a shaded pole induction motor, which may be embodied in the control system shown in Fig. 1;

Fig. 5 is a schematic wiring diagram of a similar means for controlling a shaded pole induction motor; and Figs. 6, 7, 8, and 9, illustrate the wave shapes of the currents appearing in various parts of the apparatus illustrated in Fig. 5.

Referring to Fig. 1, the general principle of the control apparatus is illustrated diagrammatically as comprising a direct current amplifier 10 which employs one or more pentodes in the amplifying circuit, the amplifier being provided with input terminals 12 and 13 adapted to be connected to a controlling source of low voltage direct current. Such voltage may be provided by a phototube or photocell, a bolometer, a resistance type thermometer, or any other suitable source providing a D. C. voltage which varies in a predetermined relationship with respect to changes in a condition which is to be measured, or which is to control the differential positioning of another element.

The amplifier 10 may be of any suitable construction, but is preferably one which includes pentodes, and is provided with a power supply 14 including a control knob 16 for varying the voltage applied to the screen grid or grids of the pentode or pentodes to vary the effective gain thereof. The output terminals 18 and 19 are respectively connected to the control grid 20 and the cathode 21 of a thyratron 22. The thyratron preferably has a second grid 24 which may be externally connected to the cathode 21.

The output of the thyratron is connected to a unidirectional motor system 26 hereinafter to be described in detail, this motor having terminals 28 connected to a suitable source of alternating current. The unidirectional motor system is connected by a suitable mechanical coupling 30 with a source 32 of constant torque opposing that of the motor system 26. This mechanical coupling is also connected to the control 16 of the power supply 14, as well as to an indicator 36. The indicator 36 is representative of any apparatus or device having a part which is to be differentially positioned in response to the voltage applied to the input terminals 12 and 13.

In the system shown in Fig. 1, the control voltage applied to the input terminals 12 and 13 is suitably amplified to an extent determined by the position of the screen voltage control 16 and the output voltage appearing at the terminals 18, 19, is utilized to control the ignition of the thyratron and thus controls the unidirectional motor system 26. When the thyratron 22 is conducting, the motor system 26 operates the common mechanical coupling 30 in one direction against the torque applied by the source 32. The movement of the mechanical coupling is in a direction such as to increase the voltage applied to the screen grids of the pentodes forming a part of amplifier 10, and such movement continues until the voltage on the grid 20 of the thyratron 22 is reduced to extinction potential, cutting off current flow through the thyratron. The motor system 26 being deenergized, the common mechanical coupling 30 is driven in the opposite direction by the source of constant torque 32 until the voltage on the screen grids of the pentodes of amplifier 10 are lowered to such value that the output voltage is again sufficient to cause ignition of the thyratron 22.

The mechanical coupling 30 and all parts moving therewith are preferably of relatively low inertia, so that the periodicity of the changes in direction of operation of the coupling may be very rapid, the result being that the indicator 36 will oscillate through such small angle that it will appear to be substantially stationary when the input voltage of the amplifier is not changing, or will appear to move smoothly in the appropriate direction as the input voltage on the amplifier 10 changes. It is readily possible, as by utilizing a long clock spring as the source 32 of torque, and having the spring apply torque directly to a common shaft operating the indicator 36 and forming part of the unidirectional motor 26, to cause such shaft to have a frequency of oscillation of 6 to 20 or more cycles per second, and at this rate the amplitude of oscillation will necessarily be relatively small.

Fig. 2 shows one form of unidirectional motor system which may be employed in the control apparatus of Fig. 1. In this motor system the source of A. C. voltage is utilized to operate an electric motor 40, the A. C. voltage being transmitted through a circuit including the thyratron 22, and a suitable audio frequency choke coil L41 having a resistor R42 in series therewith. During a portion of the applied A. C. voltage cycle, the thyratron 22 will conduct, provided that the amplified D. C. control voltage impressed between the grid and cathode is above the ignition potential, and the alternating component of the pulses appearing at the plate of the thyratron are transmitted through a circuit including the motor 40 and a blocking capacitor C44. The motor 40 is thus rotated whenever the thyratron 22 is ignited. The torque applied to the coupling system 30 by the motor 40 is resisted by a clock spring 46, which is representative of any suitable source of constant torque opposing that of the motor 40.

In Fig. 3 there is disclosed a modified form of control system which is responsive to the relative values of two input voltages, and in which a reversible shaded pole motor is utilized in place of the unidirectional motor system 26 and the source 32 of constant torque opposing that of the motor system. In Fig. 3 a pair of thyratrons 48 and 49 are employed. The input terminals of the thyratron 48 are connected to a source of amplified D. C. control voltage "A," while the input terminals of the thyratron 49 are connected to a different source of amplified D. C. control voltage "B." The output circuit of the thyratron 48 includes a protective current limiting resistor R50 and a shading coil L52, the latter forming a part of a reversible shaded pole induction motor 54 having a rotor 56. Similarly, the output circuit of the thyratron 49 includes a resistor 51 and a shading coil L53 of the motor 54. The shading coils L52 and L53 are wound on different segmental portions of the poles of the induction motor so that when current flow is permitted through the shaded coil L52 the rotor 56 will rotate in one direction, while when the circuit including coil L53 is completed the rotor 56 will rotate in the opposite direction. A field winding L57 connected to a suitable source of alternating current is provided for energization of the motor 54. When the motor is thus energized by the field coil L57, the shading coils L52 and L53 act in the manner of transformer windings to provide alternating current for the thyratrons 48 and 49. Thus whenever the control voltage "A" is sufficient to permit flow of appreciable current through the shading coil 52, the rotor 56 will rotate in one direction, whereas when the control voltage "B" is sufficient to render the thyratron 49 conducting, the rotor 56 will tend to rotate in the opposite direction. Since the shading coils L52, L53 are of equal effectiveness when equal currents are flowing therethrough, the rotor 56 will remain stationary when the control voltages "A" and "B" are equal. When, however, the current flow through the shading coil L52 is greater than that through L53, there will be a tendency for the rotor 56 to rotate in one direction, and vice versa. When both of the circuits for L52 and L53 are open, that is, neither of the thyratrons 48 or 49 is conducting, the rotor 56 will also remain stationary. Thus, a part connected to the rotor will be moved in one direction or the other depending upon the relative values of the control voltages "A" and "B."

When a system of the type shown in Fig. 3 is to be used for the control of a shaded pole induction motor in response to changes of a single potential, a circuit as shown in Fig. 4 may be employed. Such elements of this circuit as are similar to those shown in Fig. 3, have had similar reference characters applied thereto, and a description thereof will not be repeated.

In Fig. 4, the shading coil L53 is connected in a closed circuit with a suitable current limiting resistor R58. The effectiveness of the shading coil L53 is made to be substantially one-half that of the effectiveness of the shading coil L52, by using a resistance R50 of value approximately one-half that of the resistor R58. Under these circumstances, when the tyratron 48 is extinguished, the shading coil 53 will draw sufficient current to cause the rotor 56 to rotate in one direction, but due to the greater effectiveness of the shading coil L52 in influencing the direction of rotation of the rotor 56, the rotor will rotate in the opposite direction when the thyratron 48 is ignited, as when a sufficiently high potential is impressed across its input terminals.

In the form of the invention shown in Fig. 4, the motor 54 can deliver only about one-half the torque of which it would otherwise be capable, (if the shading coil L52 were not at all times effective), since the phase shift effected by the shading coil L53 is always in opposition to that provided by L52, and the effectiveness of L53 must be relatively small so that it may be exceeded substantially by that of L52 when the circuit through the latter is completed.

To make possible more efficient use of the motor 54, a circuit of the type shown in Fig. 5 may be employed. In this circuit the thyratron 48 has its input terminals connected to the source of controlling D. C. voltage and the shading coil L52 is connected in the plate circuit in series with a parallel mesh comprising a capacitor C60 and a resistor R62. The cathodes of thyratrons 48 and 49 are connected together, while the control grid of thyratron 49 is connected to a terminal 64 between L52 and the mesh C60, R62. The shading coils L52 and L53 are of opposed effectiveness in determining the direction of rotation, but each is designed to produce the maximum desirable phase shift in the field of the shaded pole motor 54.

In the circuit of Fig. 5, whenever the D. C. potential upon the input of the thyratron 48 is sufficient to cause ignition of this thyratron during the positive half cycle of the current induced in the shading coil L52, the potential on the terminal 64 will be negative relative to the cathode, and this potential will be stored in capacitor C60 and partially discharged through R62 during the subsequent half cycle. As a result, the control grid of thyratron 49 will remain at sufficiently negative potential to cut off this thyratron during the half cycle during which this thyratron would ordinarily be conducting. Therefore, the circuit through L53 remains open and this shading coil has no effect upon the operation of the motor 54. When, however, the controlling D. C. potential impressed on the input of the thyratron 48 is insufficient to cause ignition of the latter, the potential at the terminal 64 is sufficiently near zero or above zero value to permit ignition of the thyratron 49, thus completing the circuit through the coil L53 and causing the rotor 56 to rotate in the direction opposite to that which it rotates when the circuit through L52 is completed.

This operation of the circuit and apparatus of Fig. 5 is illustrated by the curves of Figs. 6 to 9.

Fig. 6 represents merely the alternating current impressed upon the coils L52 and L53, and serves as a reference for the curves appearing in Figs. 7 to 9. During the positive half cycle, when the thyratron 48 is conducting pulses 66 will appear in its plate circuit. When circuit through thyratron 49 is complete, plate current will flow through in pulses 68, shown in Fig. 8. However, when thyratron 48 is conducting, due to the provision of the mesh C60 and R62, the voltage appearing across this mesh provides negative bias on the control grid of thyratron 49, and this negative bias voltage will have a wave form of the general character indicated by the wave 70 of Fig. 9. It will be noted that this wave is inverted, and may be considered as showing the negative potential of the grid relative to the cathode of thyratron 49. The capacitor C60 is made of such value relative to R62 that the least negative potential −E$_{min}$ is sufficient to prevent ignition of thyratron 49, and the circuit through L53 is therefore maintained open during the negative half wave of the alternating current following the half wave in which the thyratron 48 was conducting. Thus no current flow takes place through thyratron 49 when thyratron 48 is conducting. When thyratron 48 is cut off due to the presence of a negative control voltage on its grid, the thyratron 49 will conduct during the negative half cycle.

By virtue of this arrangement shown in Figs. 5 to 9, the motor 54 may operate at full torque in either direction, since it will be apparent that during half cycles following those in which thyratron 48 was not ignited the thyratron 49 will be ignited and the circuit through L53 completed.

The foregoing description of the operation of the apparatus, it will be apparent to those skilled in the art, is somewhat idealized in that the thyratrons may not be ignited exactly at the zero potential point and will not be extinguished at the same potential at which they ignite, and thus the pulses shown in Figs. 7, 8, and 9 will not, in fact, be as regular as there illustrated. However, the apparatus operates in principle as described and makes it possible to obtain substantially full torque from the induction motor 54 irrespective of the direction in which it is rotated, thereby making it possible, with a relatively small motor, to drive, through the mechanical coupling 38, a part requiring substantial torque for its operation, as well as operating the voltage control determining the gain of the amplifier which supplies the control voltage to the input terminals of the thyratron 48.

In its broader aspects, the invention is not limited to the use of a D. C. voltage for controlling the operation of the apparatus. By well known means the varying amplitude or frequency of an A. C. voltage or current may readily be converted into a corresponding D. C. voltage, which, with or without amplification, may serve as the control voltage on the thyratron. Similarly in its broader aspects, the control for the screen grid voltage on the pentode forming part of the amplifier is representative of any other means for changing the degree of effectiveness of the control voltage as means for controlling the firing of the thyratron. Thus the invention may be utilized in large variety of control devices in which a part is to be moved in response to variable conditions which are capable of being translated into potential suitable for the control of a thyratron.

In Figs. 3, 4, and 5, the output circuits of the thyratrons are illustrated as including the shading windings of the motors. It will, however, be apparent to those skilled in the art that isolation transformers may be inserted between the thyratrons and the shading windings to block out the D. C. component of plate current, thereby permitting the use of smaller iron laminations in the motor field structure. Alternatively, a capacitor and choke blocking scheme, as shown in Fig. 2, can be used for the same purpose.

In Fig. 2, R42 need not be a separate resistor element, but may be representative of the resistance of the choke winding L41. The circuit through L41 thus offers relatively high impedance to the A. C. component in the output circuit of the thyratron 22, while capacitor C44 and the winding of motor 40 present low impedance to this A. C. component. The value of C44 should therefore be chosen so that the circuit through it and the winding of motor 40 will present the optimum low impedance at the frequency of the A. C. voltage applied to the terminals 28.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an apparatus for differentially positioning a part in response to the value of a direct current control voltage, means for amplifying the direct current control voltage, said means having a gain control, a pair of thyratrons, means coupling the input of the first thyratron to the output of the amplifier, a shaded pole induction motor having shading coils for producing opposite phase shifts in the field of the motor, a source of alternating current for energizing the motor, a circuit connecting one of the shading coils in the plate circuit of the first thyratron, said plate circuit including a parallel resistor and capacitor connected between the cathode of the first thyratron and said shading coil, said resistor and capacitor having a time constant approximating that of one-half cycle of the alternating current source, a plate circuit for the other of the thyratrons including the second shading coil, a connection from the plate circuit of the first thyratron to the control grid of the second thyratron whereby a cutoff biasing potential is impressed upon the second thyratron whenever the first thyratron is conducting, and a coupling between the motor and the gain control of the amplifying means operable to effect an increase in the bias upon the first thyratron whenever the latter is conducting.

2. In an apparatus for differentially positioning a part in response to a control voltage, comprising a direct current amplifier having input and output terminals and having means for varying its effective gain, the control voltage being impressed across its input terminals, a first and second thyratron, the first thyratron having its input terminals connected to the output terminals of the amplifier, a coupling means connecting the first thyratron to the second thyratron to cause the latter to be cut off when the first thyratron is conducting, a reversible motor system, a coupling between the motor system and the output of the thyratrons, said coupling operating to cause rotation of the motor system in one direction when the output of the first of the thyratrons exceeds a predetermined value and to cause the second thyratron to be rendered ineffective, and to cause rotation of the motor system in the opposite direction when the first thyratron output is less than said predetermined value and the second thyratron is effective, and a mechanical coupling between the motor and the means for controlling the gain of the amplifier.

3. In an apparatus for differentially positioning a part in response to the value of a direct current control voltage, means for amplifying the direct current control voltage, said means having a gain control, a pair of thyratrons, means coupling the input of the first thyratron to the output of the amplifier, a shaded pole induction motor having shading coils for producing opposite phase shifts in the field of the motor, a source of alternating current for energizing the motor, a circuit connecting one of the shading coils in the plate circuit of the first thyratron, said plate circuit including a time delay mesh, a plate circuit for the second thyratron including the second shading coil, a connection from the plate circuit of the first thyratron to the control grid of the second thyratron whereby a cutoff biasing potential is impressed upon the second thyratron whenever the first thyratron is conducting, and a coupling between the motor and the gain control of the amplifying means operable to effect an increase in the bias upon the first thyratron whenever the latter is conducting.

FRANK A. FANTA, Jr.

REFERENCES CITED

The following references are of record in the file of this patent:

UNITED STATES PATENTS

| Number | Name | Date |
|---|---|---|
| 2,333,393 | Ryder | Nov. 2, 1943 |
| 2,363,473 | Ryder | Nov. 21, 1944 |
| 2,371,415 | Tolson | Mar. 13, 1945 |

FOREIGN PATENTS

| Number | Country | Date |
|---|---|---|
| 522,130 | Great Britain | June 10, 1940 |